Dec. 6, 1966 S. P. TUREK ET AL 3,289,971
AUTOMATIC RETRACTING MEANS FOR SAFETY
BELTS AND THE LIKE
Filed March 20, 1964 2 Sheets-Sheet 1

INVENTORS
Stanley P. Turek
Wilbur C. Lincoln
By Frank H. Marlos,
Nathan H. Kraus, Att'ys Dec. 6, 1966 S. P. TUREK ETAL 3,289,971
AUTOMATIC RETRACTING MEANS FOR SAFETY
BELTS AND THE LIKE
Filed March 20, 1964 2 Sheets-Sheet 2

INVENTORS
Stanley P. Turek
Wilbur C. Lincoln
By
Nathan U. Kraus, Att'ys

United States Patent Office 3,289,971
Patented Dec. 6, 1966

3,289,971
AUTOMATIC RETRACTING MEANS FOR SAFETY
BELTS AND THE LIKE
Stanley P. Turek, 4439 S. Knox Ave., and Wilbur C. Lincoln, 11146 S. Green St., both of Chicago, Ill.
Filed Mar. 20, 1964, Ser. No. 353,437
8 Claims. (Cl. 242—107.11)

One of the objects of this invention is the provision of means intended for attachment to a conventional vehicle such as an airplane or automobile a safety seat belt retractor for automatically rolling-up or retracting the belt when the same is not in use, so that it is always maintained out of the way in a neat and ready to use condition.

Another object of this invention is the provision of belt retracting means for the foregoing character which is adapted for ready attachment to an existing seat belt installation or to a new installation.

A further object of this invention is the provision of belt retracting means which is simple in construction, inexpensive to manufacture, efficient in operation and requires no skill for installation.

Other and further objects and advantages of this invention will become apparent from the following description when the same is considered in connection with the accompanying drawings in which, FIG. 1 is a side elevational view of one embodiment of the invention, showing the same applied to a seat belt with the belt in extended condition, as in use.

Figure 1:
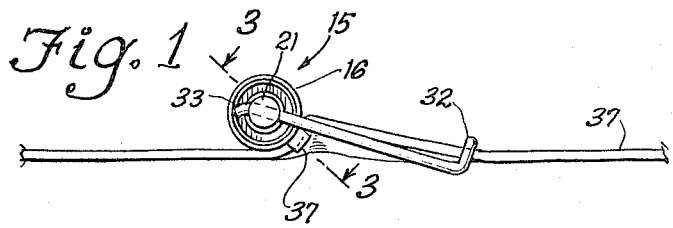

Referring, particularly to FIGS. 1 through 5, the numeral 15 indicates generally a belt retractor comprising a tubular metal casing 16 into one open end of which is press-fitted a cupped end member 17 provided with a central aperture 18, there being a flange 19 concentric with said aperture, the flange affording a bearing for one end of a rotatable spindle 21. The opposite end of spindle 21 is knurled as at 22 and a cupped end member 23 similar to the end member 17 is press-fitted onto the spindle so that the knurls bite into the center flange 24 of end member 23 and afford a tight engagement between the spindle 21 and end member 23. The end member 23 is of slightly smaller diameter than the bore of the casing 16 so that both the spindle and end member 23 are rotatable as a unit within the casing. The spindle 21 is provided with a transverse aperture 26 at each end.

Figure 2:
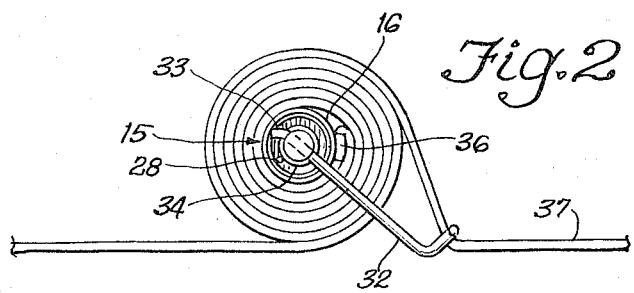
FIG. 2 is a similar view on an enlarged scale but showing the belt in rolled-up or retracted condition.
Figure 3:
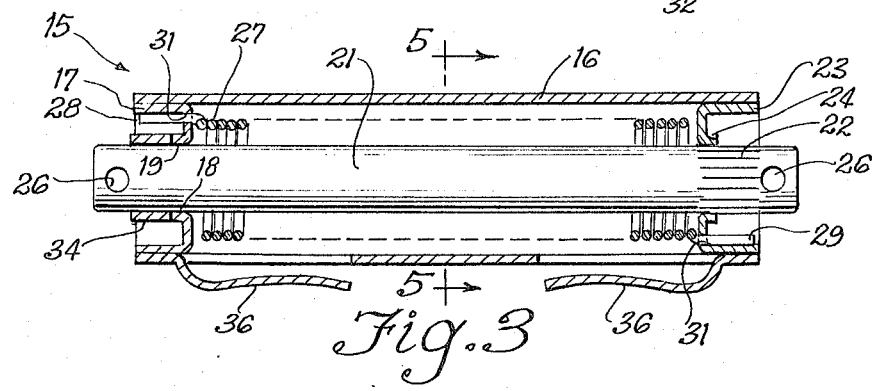
FIG. 3 is a longitudinal cross-sectional view, on an enlarged scale, partly in elevation, also of the embodiment illustrated in FIGS. 1 and 2 without the belt and bail.
Figure 4:
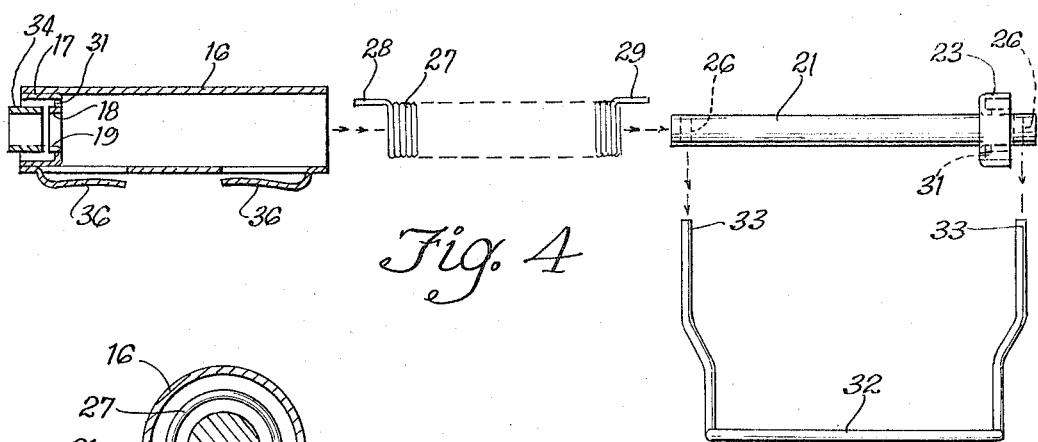
FIG. 4 is an exploded view of the component parts of the belt retractor with certain parts shown in cross-section and others in elevation.
Figure 5:
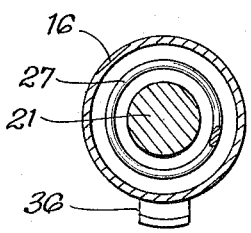
FIG. 5 is a cross-sectional view taken substantially on line 5—5 of FIG. 3.
Figure 6:
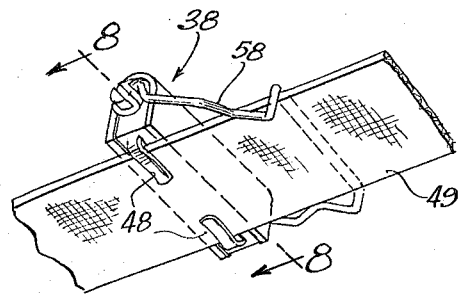
FIG. 6 is a bottom perspective view of a modified embodiment of our invention, showing the same attached to a belt, with the belt in extended condition, as in use.
Figure 7:
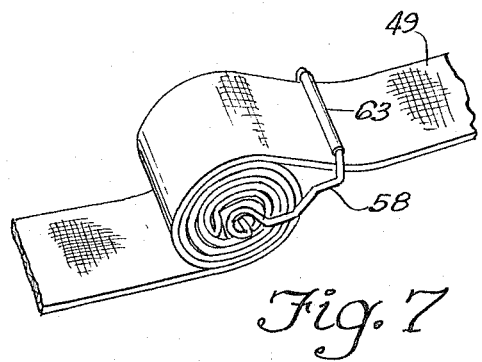
FIG. 7 is a top perspective view of the same with the belt in rolled-up or retracted condition.
Figure 8:
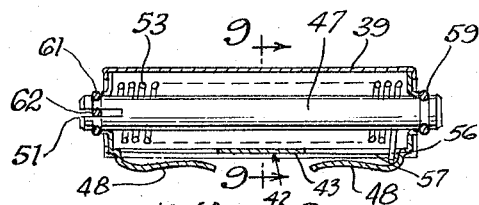
FIG. 8 is a longitudinal cross-sectional view partly in elevation, taken substantially on line 8—8 of FIG. 6.

A coiled torsion spring 27 is circumposed about the spindle 21 within the casing 16 and has oppositely directed end portions 28 and 29 extending parallel to the axis of the spring and arranged to be received in apertures 31 provided in the end members 17 and 23. A generally U-shaped wire bail 32, shaped substantially as illustrated, has its legs received in the apertures 26 of the spindle with the terminal portions 33 of the legs being bent, as illustrated in FIGS. 1 and 2, to secure the bail in assembled relation to the spindle.

A bushing 34 carried on one end of the spindle 21 serves as a spacer to maintain a leg of the bail out of engagement with the corresponding edge of the casing 16, thereby to ensure free movement of the bail relative to the casing.

A pair of fingers 36 are struck out from the wall of the casing at opposite ends thereof. The fingers are longitudinally alined and in spaced relation and are arranged to receive therebetween a belt 37.

The retractor 15 is intended to be attached to a belt 37 substantially medially of the length thereof, it being understood that each cooperating section of a safety belt will have attached thereto a separate retractor. Attachment is effected by first inserting one longitudinal edge of the belt into the space between finger 36 and the casing 16 and then repeating the same operation with the opposite edge of the belt. The belt is then folded upon itself, the fold line coinciding with the aligned edges of the fingers, and the doubled reaches of the belt are wrapped around the casing, as illustrated in FIG. 2, with one of the belt reaches being engaged by the bail 32. In use, one end of each belt section is secured to a conventional fastening means anchored to the floor of the vehicle while the other end which is provided with a suitable buckle element is free. The buckle elements cooperate to secure the belt about the body of a user.

It will be apparent that as the free end of each belt section is drawn in a direction to extend the belt so as to embrace the user, the casing 16 will be caused to be rotated relative to the spindle 21 which is maintained in stationary condition by reason of the bail 32 bearing on the belt 37. Rotation of the casing 16 as above described, results in a winding up or tightening of the spring 27 with the imposition of a progressively increasing tension on the belt. Thus, when the buckle elements are detached from each other the spring tends to rewind the belt back on the casing, thereby retracting the belt and retaining it in that condition and ready for use.

It will be understood that the retractor may be used without providing an initial torsional stress on the spring 27 so that when the retractor is in a non-use condition the spring is not stressed. In such case the free ends of the belt sections may not necessarily be fully retracted. However, if it is desired to fully retract the belt so that the buckle on the free end of the belt actually abuts against the bail, an initial torsional stress may be applied either before or after assembly of the retractor to the belt, merely by rotating the bail 32 relative to the casing 16 one or more revolutions. The spring 27 may be pre-stressed at the point of manufacture and retained in such condition by the use of a cotter pin, not shown, which is inserted in an aperture provided in the end member 17, the cotter pin acting as a stop or abutment for one leg of the bail to prevent relative movement between the bail and the casing.

In the modified embodiment illustrated in FIGS. 6 through 11, the retractor 38 comprises a casing 39 formed preferably of sheet metal and shaped in cross-section in generally U-formation, as illustrated. The casing 39 is provided with inturned flanges 41 both along the ends and longitudinal edges. A closure member 42 for the casing, illustrated in FIG. 11, includes an elongated portion 43 with a pair of integral ears 44 at the ends disposed at right angles to the portion 43. The ears, of course, are shaped to be received in the ends of the casing 39 with the flanges 41 overlapping the marginal edge portions of the ears 44 and the elongated portion 43 of the member 42. The ears 44 are pierced to provide a pair of coaxially aligned apertures 46, each of which has a ring of upset metal concentric with the aperture affording a bearing for rotatably supporting a spindle 47. The portion 43 is provided with a pair of fingers 48 which are struck out and offset from the plane thereof and are arranged to accommodate a belt 49 therebetween.

The spindle 47 is provided at one end with a transverse slot 51 extending inwardly a short distance from the end and each end portion of the shaft is provided with an annular groove 52. A torsion spring 53 is circumposed about the spindle within the casing and one end portion 54 of the spring is bent so as to be disposed diametrically of the spring and is adapted to be received in the slot 51 of the spindle while the opposite end 56 of the spring is bent into a hook formation which is arranged to be received in an aperture 57 provided in the portion 43 of the closure member 42.

Figure 9:
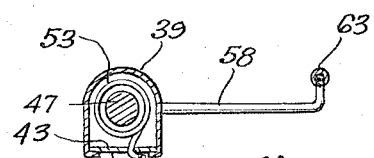
FIG. 9 is a cross-sectional view taken substantially on line 9—9 of FIG. 8.
Figure 10:
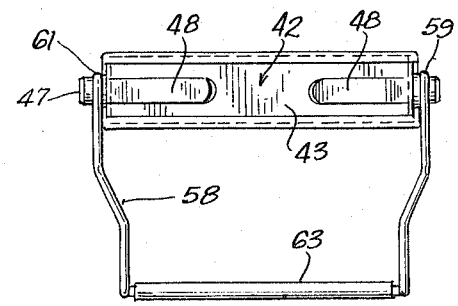
FIG. 10 is a bottom plan view of the same.
Figure 11:
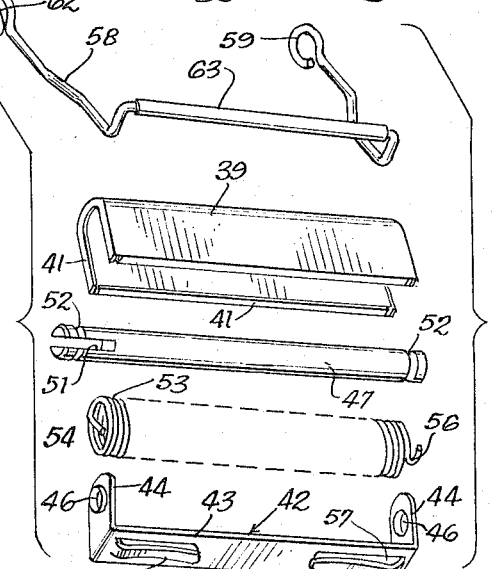
FIG. 11 is an exploded perspective view illustrating the component parts of the modified embodiment.

A wire bail 58, shaped substantially as illustrated in FIG. 9, is provided at the end of one of its legs with a loop 59 arranged to be snapped on to the end of the spindle 47 and to be received in the corresponding annular groove 52. The opposite leg of the bail terminates in a loop 61 also arranged to snap on to the opposite end of the spindle but additionally is provided with a diametrically extending projection 62 which is arranged to be received in the slot 51 of the spindle. Thus, the spindle 47 and bail 58 are keyed together and operate as a unit. An elongated roller 63 is carried on the transverse portion of the bail and serves to reduce friction between the belt and bail in the operation of the retractor.

In use, the retractor of our invention is applied to a belt in the same manner as hereinbefore described and the tension of the torsion spring may be adjusted as desired, in the same manner as explained with respect to the first described embodiment.

Various changes coming within the spirit of our invention may suggest themselves to those skilled in the art; hence, we do not wish to be limited to the specific embodiments shown and described or uses mentioned, but intend the same to be merely exemplary, the scope of our invention being limited only by the appended claims.

We claim:
1. A belt retractor comprising
  (a) an elongated casing,
  (b) means on said casing for attaching said casing to a belt intermediate the ends thereof,
  (c) a spindle extending through said casing and journalled for rotation relative thereto, the ends of said spindle extending beyond said casing,
  (d) a coiled torsion spring circumposed about said spindle within said casing and having one end connected to said casing and the other end connected to said spindle, and
  (e) a generally U-shaped wire bail connected to said spindle in rigid relation thereto and arranged to engage the belt,
  (f) said spring being effective to rotate said casing to roll-up said belt on said casing.
2. A belt retractor comprising,
  (a) a generally tubular casing,
  (b) a pair of spaced fingers struck out from the wall of said casing, the fingers extending longitudinally and affording means for securing a belt to said casing,
  (c) a spindle extending through said casing and journalled for rotation relative thereto, the ends of said spindle extending beyond said casing,
  (d) a coiled torsion spring circumposed about said spindle within said casing and having one end connected to said casing and the other end connected to said spindle,
  (e) and a generally U-shaped bail rigidly mounted on said spindle and arranged to engage the belt,
  (f) said spring being effective to rotate said casing to roll-up said belt on said casing.
3. A belt retractor comprising,
  (a) a casing generally U-shaped in cross-section,
  (b) a flat closure plate for said casing,
  (c) said closure plate having a pair of spaced fingers struck out of the plane thereof, the fingers being in spaced relation and substantially longitudinally aligned,
  (d) a belt secured to said closure plate by said fingers,
  (e) a spindle extending through said casing and journalled for rotation relative thereto,
  (f) a coiled torsion spring circumposed about said spindle within said casing and having one end connected to said casing and the other end connected to said spindle, and
  (g) a generally U-shaped bail rigidly mounted on said spindle and arranged to engage the belt,
  (h) said spring being effective to rotate said casing to roll-up said belt on said casing.
4. A belt retractor comprising
  (a) a casing generally U-shaped in cross-section,
  (b) a flat closure plate for said casing,
  (c) said closure plate having spaced integral fingers longitudinally aligned and having an up-turned ear at each end,
  (d) a belt secured to said closure plate by said fingers,
  (e) said ears having coaxially aligned apertures,
  (f) a spindle journalled in said apertures for rotation,
  (g) a coiled torsion spring circumposed about said spindle within said casing and having one end connected to said casing and the other end connected to said spindle,
  (h) and a generally U-shaped bail rigidly mounted on said spindle and arranged to engage the belt,
  (i) said spring being effective to rotate said casing to roll-up said belt on said casing.
5. The invention as defined in claim 3 in which the spindle is provided at each end with an annular recess and the bail is provided with yieldable loops which engage in said recesses.
6. The invention as defined in claim 3 in which one end of the spindle is slotted to receive one end of the spring and one end of a leg of the bail.
7. A belt retractor comprising
  (a) a generally tubular casing,
  (b) a first circular end member fixed in one end of said casing and having an aperture centrally thereof,
  (c) a spindle extending through said casing and journalled at one end in said aperture,
  (d) said spindle having a second circular end member fixed thereon,
  (e) said second circular member being rotatably received in the opposite end of said casing,
  (f) a coiled torsion spring circumposed about said spindle within said casing and having one end connected to said casing and the other end connected to said spindle,
  (g) a pair of spaced fingers struck out from the wall of said casing, the fingers extending longitudinally of the casing and affording means for securing a belt to said casing, (h) a generally U-shaped bail rigidly mounted on said spindle and arranged to engage the belt, (i) said spring being effective to rotate said casing to roll-up said belt on said casing.

8. The invention as defined in claim 7, in which the ends of the spindle are pierced to receive the ends of the legs of the bail.

References Cited by the Examiner

UNITED STATES PATENTS

| | | | |
|---|---|---|---|
| 1,313,644 | 8/1919 | Simon | 297—388 |
| 1,657,190 | 1/1928 | Ballou | 24—68 |
| 2,541,476 | 2/1951 | Mihalyi | 242—71.1 |

FRANK B. SHERRY, *Primary Examiner.*

CASMIR A. NUNBERG, *Examiner.*

J. S. PETRIE, R. B. FARLEY, *Assistant Examiners.*